(12) United States Patent
Maddu et al.

(10) Patent No.: US 11,509,626 B2
(45) Date of Patent: Nov. 22, 2022

(54) SYSTEM AND METHOD FOR NETWORK IP ADDRESS CAPACITY ANALYTICS AND MANAGEMENT

(71) Applicant: JPMorgan Chase Bank, N.A., New York, NY (US)

(72) Inventors: Prasanna Sagar Maddu, Hyderabad (IN); Pradeep Sai Ramisetty, Hyderabad (IN); Krishna Chaitanya Marreddy, Hyderabad (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/161,886

(22) Filed: Jan. 29, 2021

(65) Prior Publication Data

US 2021/0234830 A1 Jul. 29, 2021

Related U.S. Application Data

(60) Provisional application No. 62/967,191, filed on Jan. 29, 2020.

(51) Int. Cl.
| | |
|---|---|
| *H04L 61/5007* | (2022.01) |
| *G06F 9/54* | (2006.01) |
| *H04L 9/40* | (2022.01) |
| *G06N 5/04* | (2006.01) |
| *H04L 61/4511* | (2022.01) |
| *H04L 61/5046* | (2022.01) |
| *H04L 67/10* | (2022.01) |
| *H04L 67/1008* | (2022.01) |
| *H04L 47/783* | (2022.01) |
| *G06N 20/00* | (2019.01) |
| *H04L 101/668* | (2022.01) |
| *G06F 9/50* | (2006.01) |

(52) U.S. Cl.
CPC ......... *H04L 61/5007* (2022.05); *G06F 9/541* (2013.01); *G06N 5/04* (2013.01); *H04L 47/783* (2013.01); *H04L 61/4511* (2022.05); *H04L 61/5046* (2022.05); *H04L 63/0263* (2013.01); *H04L 67/10* (2013.01); *H04L 67/1008* (2013.01); *G06F 9/5027* (2013.01); *G06N 20/00* (2019.01); *H04L 2101/668* (2022.05)

(58) Field of Classification Search
CPC ............. H04L 61/2007; H04L 61/2061; H04L 61/1511; H04L 61/6068; H04L 61/5007; H04L 61/5046; H04L 61/4511; H04L 63/0263; G06F 9/541; G06N 5/04
See application file for complete search history.

(56) References Cited

U.S. PATENT DOCUMENTS

| | | | |
|---|---|---|---|
| 6,795,709 B2 * | 9/2004 | Agrawal | H04L 29/12283 370/331 |
| 7,197,549 B1 * | 3/2007 | Salama | H04L 61/5061 710/4 |
| 7,349,392 B2 * | 3/2008 | Banerjee | H04L 61/5061 709/245 |

(Continued)

*Primary Examiner* — Nam T Tran
(74) *Attorney, Agent, or Firm* — Greenblum & Bernstein, P.L.C.

(57) ABSTRACT

An embodiment of the present invention is directed to analyzing historical network capacity allocations, using machine learning to predict future capacity needs and automating network capacity management activities such as allocations and de-allocations.

20 Claims, 6 Drawing Sheets

Choose a Data Center  510

CDC1 ▽

520  Subnet Demand Forecast On Daily Basis

| Date | Forecast |
|---|---|
| 08/03/2020 | 26 |
| 08/04/2020 | 41 |
| 08/05/2020 | 54 |
| 08/06/2020 | 52 |
| 08/07/2020 | 41 |
| 08/08/2020 | 4 |
| 08/09/2020 | 8 |

530  Subnet Demand Forecast On Weekly Basis

| Week | In Use | Available | Capacity Forecast | Extra Capacity Needed |
|---|---|---|---|---|
| 08/03/2020-08/09/2020 | 19513 | 54911 | 226 | 0 |
| 08/10/2020-08/16/2020 | | | 216 | |

(56) References Cited

U.S. PATENT DOCUMENTS

| | | | |
|---|---|---|---|
| 7,929,552 B2* | 4/2011 | Streijl | H04L 61/2061 370/401 |
| 2004/0133690 A1* | 7/2004 | Chauffour | H04L 61/2514 709/229 |
| 2014/0082164 A1* | 3/2014 | Niemoller | H04L 61/2061 709/221 |
| 2019/0334785 A1* | 10/2019 | Penar | H04L 47/10 |
| 2020/0193313 A1* | 6/2020 | Ghanta | G06F 16/9038 |

* cited by examiner

Choose a Data Center 510

CDC1 ▽

520 Subnet Demand Forecast On Daily Basis

| Date | Forecast |
|---|---|
| 08/03/2020 | 26 |
| 08/04/2020 | 41 |
| 08/05/2020 | 54 |
| 08/06/2020 | 52 |
| 08/07/2020 | 41 |
| 08/08/2020 | 4 |
| 08/09/2020 | 8 |

530 Subnet Demand Forecast On Weekly Basis

| Week | In Use | Available | Capacity Forecast | Extra Capacity Needed |
|---|---|---|---|---|
| 08/03/2020-08/09/2020 | 19513 | 54911 | 226 | 0 |
| 08/10/2020-08/16/2020 | | | 216 | |

Figure 5

SYSTEM AND METHOD FOR NETWORK IP ADDRESS CAPACITY ANALYTICS AND MANAGEMENT

CROSS REFERENCE TO RELATED APPLICATIONS

The application claims priority to U.S. Provisional Application 62/967,191, filed Jan. 29, 2020, the contents of which are incorporated herein in their entirety.

FIELD OF THE INVENTION

The invention relates generally to a system and method for implementing network IP address capacity analytics, prediction and management.

BACKGROUND OF THE INVENTION

Currently, network IP address range allocations and/or de-allocations are handled in a manual fashion involving multiple teams working in silos. Each stage may have a Service Level Agreement (SLA) of 3 to 5 days. When Infrastructure-as-a-Service (IaaS) and Platform-as-a-Service (PaaS) teams need network IP address ranges in data centers for consumption (a stage in their automated workflows), a sequence of involved steps are required. First, manual requests are raised with a network capacity team, who then raises manual requests with another team to actually handle the requests. This team then scans network devices for the Network IP address ranges that are being used currently and checks available address ranges from a list they maintain. These address ranges are then reserved in Domain Name System (DNS) services (e.g., BlueCat) and provided to a Network ILM (infrastructure lifecycle management) team or network assignments team. These teams may then configure the address ranges on network devices and additionally configure firewall policies associated with those data centers.

The whole process can take 30-40 days and over 120 business days a year are spent for such requests. Current efforts involve lengthy wait times for customers.

These and other drawbacks exist.

SUMMARY OF THE INVENTION

According to an embodiment, the invention relates to a system that provides network IP address capacity analytics and management. The system comprises: a repository that stores and manages IP subnets; an interactive interface that displays subnet demand forecast data; and a capacity management processor coupled to the repository and the interactive interface and further programmed to perform the steps of: applying historical data analysis to determine a capacity prediction; responsive to the analysis, identifying one or more IP subnets to address the capacity prediction; determining whether the one or more IP subnets are available in the repository; reserving the one or more IP subnets with a subnet reservation service; registering the one or more IP subnets in a server; adding, at the subnet reservation service, the one or more IP subnets in a DNS service; delivering the IP subnets for configuration; and applying, at a network configuration service, at least one rule to the one or more IP subnets.

According to another embodiment, the invention relates to a method that provides network IP address capacity analytics and management. The method comprises the steps of: applying, via a computer processor, historical data analysis to determine a capacity prediction; responsive to the analysis, identifying one or more IP subnets to address the capacity prediction; determining whether the one or more IP subnets are available in a repository, wherein the repository stores and manages IP subnets; reserving the one or more IP subnets with a subnet reservation service; registering the one or more IP subnets in a server; adding, at the subnet reservation service, the one or more IP subnets in a DNS service; delivering the IP subnets for configuration; applying, at a network configuration service, at least one rule to the one or more IP subnets; and displaying, via an interactive interface, subnet demand forecast data.

An embodiment of the present invention may include a specially programmed computer system comprising one or more computer processors, interactive interfaces, electronic storage devices, and networks. The computer implemented system and method described herein provide unique advantages to organizations, various entities, users and other participants, according to various embodiments of the invention. An embodiment of the present invention is directed to analyzing historical network capacity allocations, using machine learning to predict future capacity needs and automating network capacity management activities such as allocations and de-allocations. Benefits may include automated workflows, reduction in human errors and centralized capacity data. An embodiment of the present invention may be leveraged across multiple applications to request network capacity. Current systems require manual effort by multiple teams, whereas an embodiment of the present invention is directed to automating the entire process to reduce human errors and realize significant savings in time and resources. In addition, an embodiment of the present invention seeks to provide centralized audit data. This facilitates meeting various regulatory standards requirements where change controls may be implemented efficiently. This further enables cybersecurity controls and enhanced security. Accordingly, an embodiment of the present invention seeks to improve customer and client experiences as well as provide quality data and advanced analytics.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the present invention.

FIG. 5 is an exemplary interactive interface, according to an embodiment of the present invention.

DETAILED DESCRIPTION OF THE PREFERRED EMBODIMENT(S)

Figure 1:
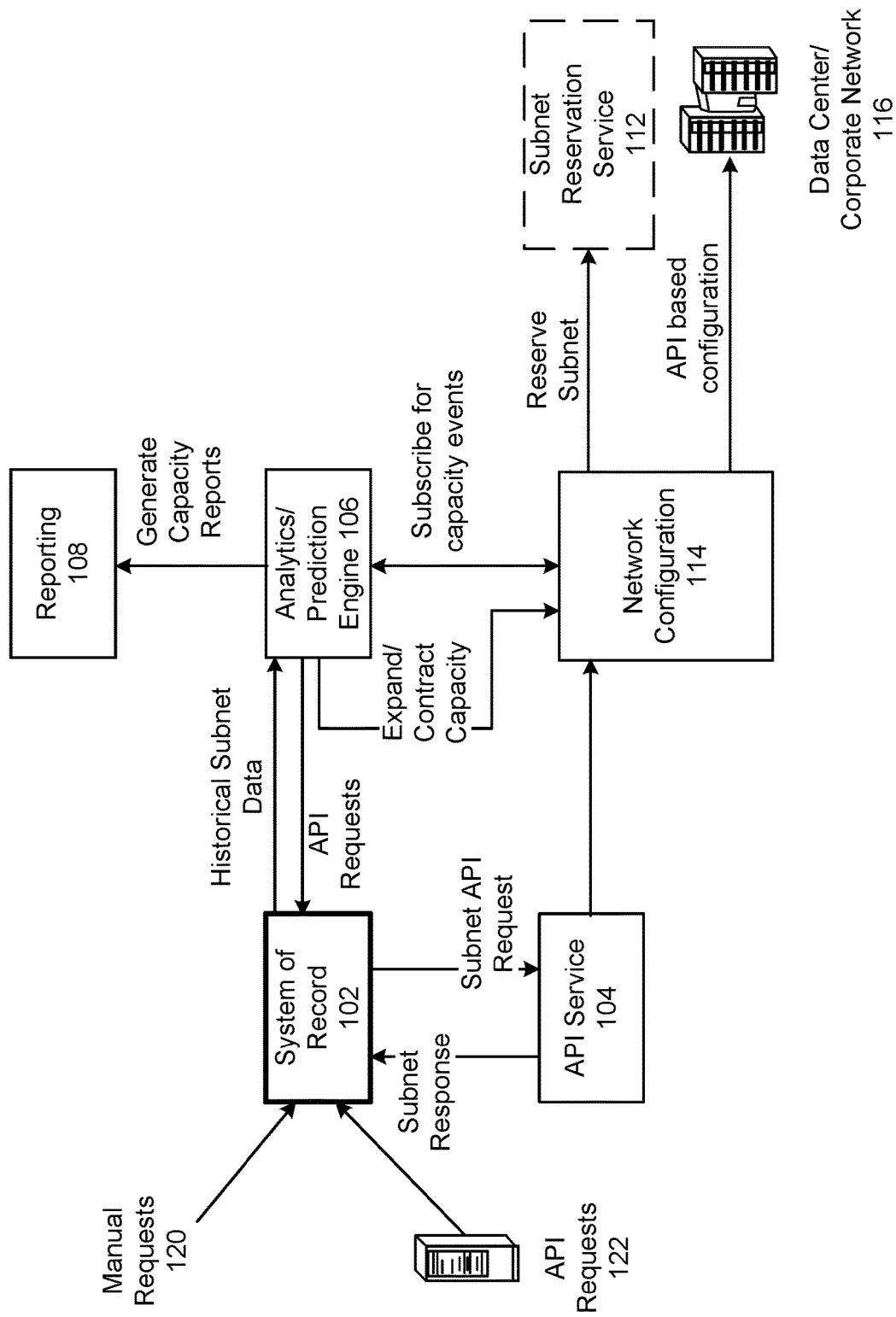
FIG. 1 is an exemplary process flow, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art in light of known systems and methods, would appreciate the use of the invention for its intended purposes and benefits in any number of alternative embodiments, depending upon specific design and other needs.

An embodiment of the present invention is directed to analyzing historical network capacity allocations, using machine learning to predict future capacity needs and automating network capacity management activities such as allocations and de-allocations.

According to an exemplary embodiment, time series analytics may be applied to predict future capacity of network IP address ranges. For example, an embodiment of the present invention may analyze historical requests to predict future requests. Based on these predictions, the IP address ranges may be automatically configured for implementation. In this application, IP addresses may be deployed and policies may be established to enable connectivity. The predictions may be updated continuously based on incoming request and other data. The requests may include requests for IP addresses from various users, customers, etc.

Accordingly, a customer may make a request via an application programming interface (API). An embodiment of the present invention may perform analytics to make predictions based on historical request and other data. In response to the request and based on the predictions, an embodiment of the present invention may then provide preconfigured IP address ranges and subnets, which may be provisioned and/or deployed on switches, routers, etc.

Based on predictions made using time series forecasting, an embodiment of the present invention may automatically reserve IP address ranges. When a request is received (via an API based request, for example), an embodiment of the present invention may simultaneously provide the IP address ranges. Accordingly, the request would have been anticipated based on the prediction and forecasting analysis so that configured IP address ranges and subnets may be available and provisioned on various devices, including switches, routers, etc.

An embodiment of the present invention is directed to automation, predictive analytics and systems of records management. Automation may be achieved by providing APIs for network capacity management. The APIs may be consumed by various systems and software defined networks for identifying, reserving and configuring network IP address ranges.

Predictive Analytics may involve expanding and contracting the network IP address capacity based on historical data on the network capacity requests and/or other considerations.

Systems of record management may involve managing network address ranges and associated information. With an embodiment of the present invention, application of predictive analytics may provide pre-configured IP network address ranges even before customers request network address capacity thereby minimizing the amount of time customers wait before they can get the network address ranges.

An embodiment of the present invention is directed to network vendor abstraction to address multiple network devices for configuring the address ranges on those devices, provide support for IPv6 address ranges and provide support for Virtual IP (VIP) capacity management.

FIG. 1 is an exemplary process flow, according to an embodiment of the present invention. As shown in FIG. 1, an exemplary embodiment may include interactions between a System of Record (SoR) 102, API Service 104, Analytics/Prediction Engine 106, Reporting 108, Subnet Reservation Service 112 and Network Configuration 114. A request may be received by SoR 102. The request may be a manual request 120 from a user and/or API request as shown by 122. For example, API request may include cloud compute workflow, etc. SoR 102 may communicate with API Service 104, via Subnet Response and Subnet API Request. SoR 102 may provide historical subnet data to Analytics/Prediction Engine 106 and receive API requests. Analytics/Prediction Engine 106 may generate reports, including capacity reports, via Reporting 108. Analytics/Prediction Engine 106 may communicate with Network Configuration 114 via expand/contract capacity requests. Also, Analytics/Prediction Engine 106 may subscribe for capacity events. API Service 104 may send data to Network Configuration 114. Network Configuration 114 may communicate reserve subnet requests to Subnet Reservation 112. In addition, API based configuration data may be stored and managed by Data Center/Corporate Network represented by 116. While the process of FIG. 1 illustrates certain steps performed in a particular order, it should be understood that the embodiments of the present invention may be practiced by adding one or more steps to the processes, omitting steps within the processes and/or altering the order in which one or more steps are performed.

Figure 2:
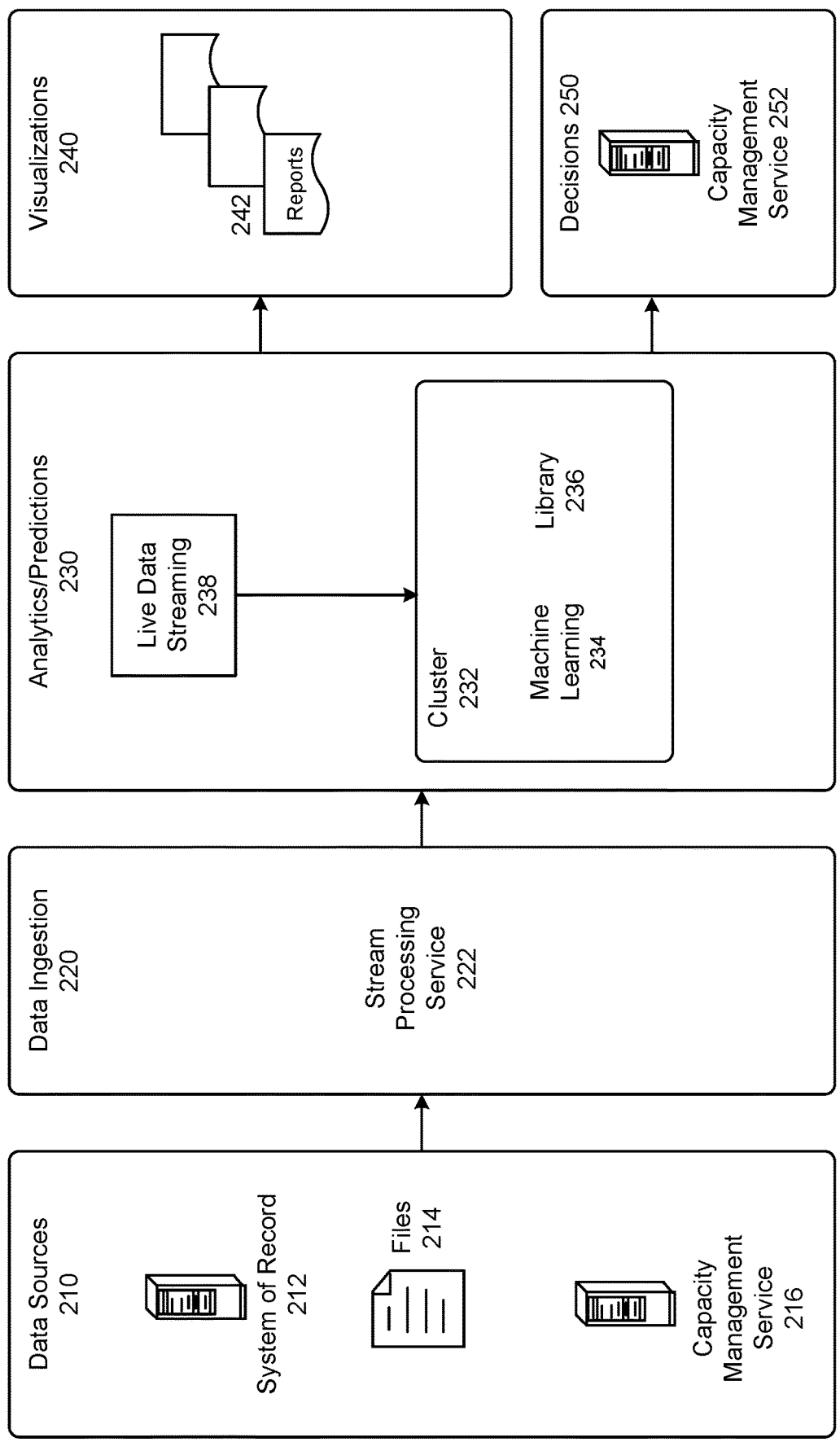
FIG. 2 is an exemplary system diagram, according to an embodiment of the present invention.

FIG. 2 is an exemplary system diagram, according to an embodiment of the present invention. An exemplary system comprises Data Sources 210, Data Ingestion 220, Analytics/Predictions 230, Visualizations 240 and Decisions 250. FIG. 2 illustrates on exemplary scenario. Other products and services may be implemented in accordance with the various embodiments of the present invention. As shown in FIG. 2, data sources may include System of Records 212, Files 214 and Capacity Management Service 216. Data Ingestion may be provided by stream processing services, e.g., Kafka, etc. Analytics/Predictions 230 may be provided by Cluster 232 that may include machine learning components, represented by Machine Learning 234 (e.g., Spark Mallis, etc.) and Library 236 (e.g., TensorFlow, other libraries for numerical computation) and live data streaming 238 (e.g., Spark Streaming, etc.). Visualizations 240 may include analytics platform and reports represented by 242. Other interactive interfaces may be implemented. Decision 250 may include Capacity Management Service 252. FIG. 2 illustrates one exemplary illustration; other variations in architecture and implementation may be realized.

Figure 3:
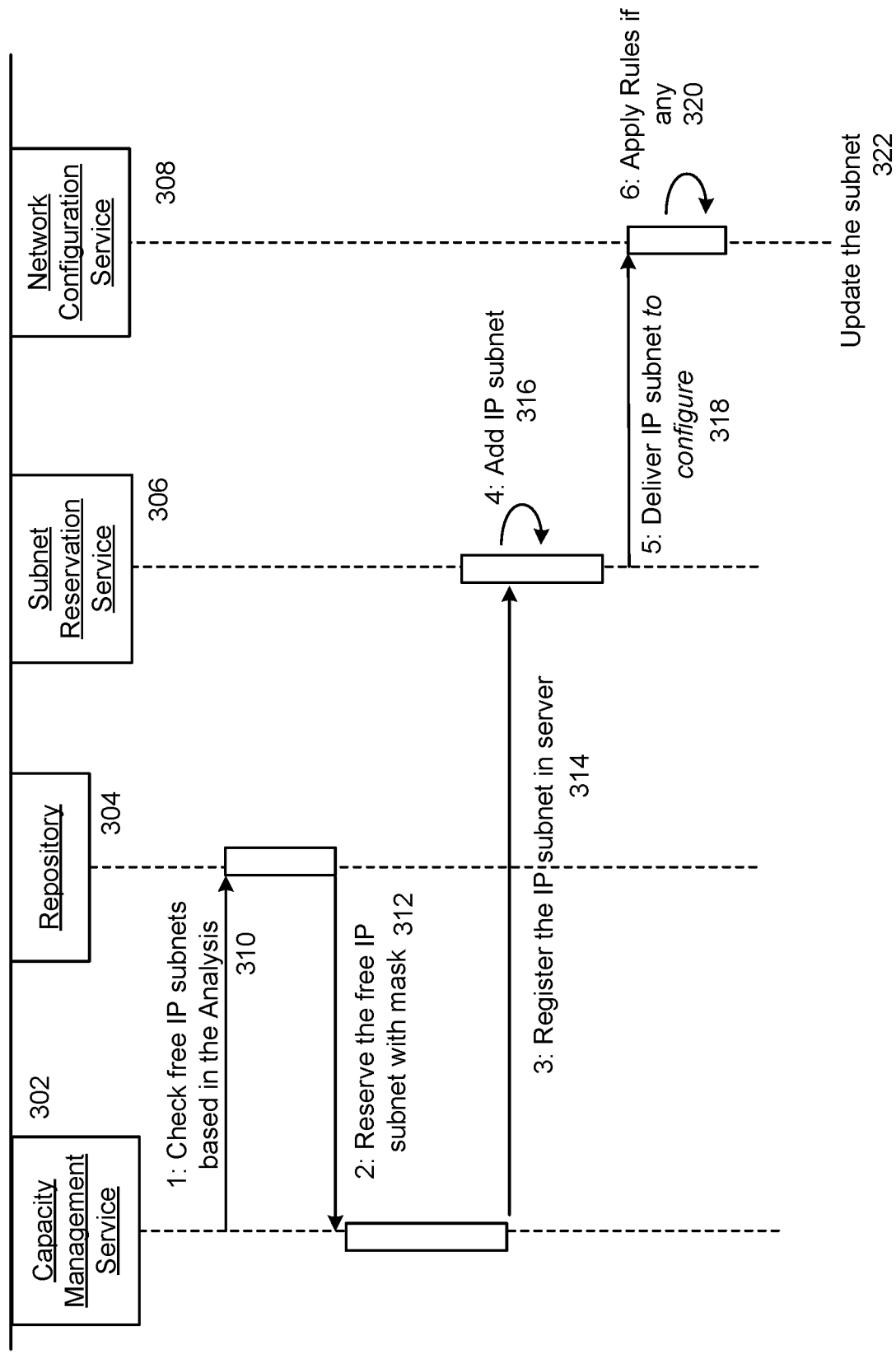
FIG. 3 is an exemplary workflow, according to an embodiment of the present invention.

FIG. 3 is an exemplary capacity management workflow, according to an embodiment of the present invention. FIG. 3 illustrates interactions between Capacity Management Service 302, Repository 304, Subnet Reservation Service 306 and Network Configuration Service 308. As shown at 310, Capacity Management Service 302 may check for free or available IP subnets based on analysis. This analysis may involve applying historical data analysis to determine a capacity prediction. Analytics applied to historical data may include time series analytics. At 312, a free IP subnet with a range may be reserved. The free IP subnet may be reserved with mask, which may refer to a subnet bit mask which represents the capacity of the subnet IP addresses to be reserved or allocated. At 314, IP Subnet may be registered in a server, e.g., IP address management server. At 316, the IP subnet may be added to a DNS service. At step 318, IP Subnet may be delivered for configuration. At step 320, one or more rules may be applied. For example, the one or more rules may include firewall rules. While the process of FIG. 3 illustrates certain steps performed in a particular order, it should be understood that the embodiments of the present invention may be practiced by adding one or more steps to the processes, omitting steps within the processes and/or altering the order in which one or more steps are performed.

Figure 4:
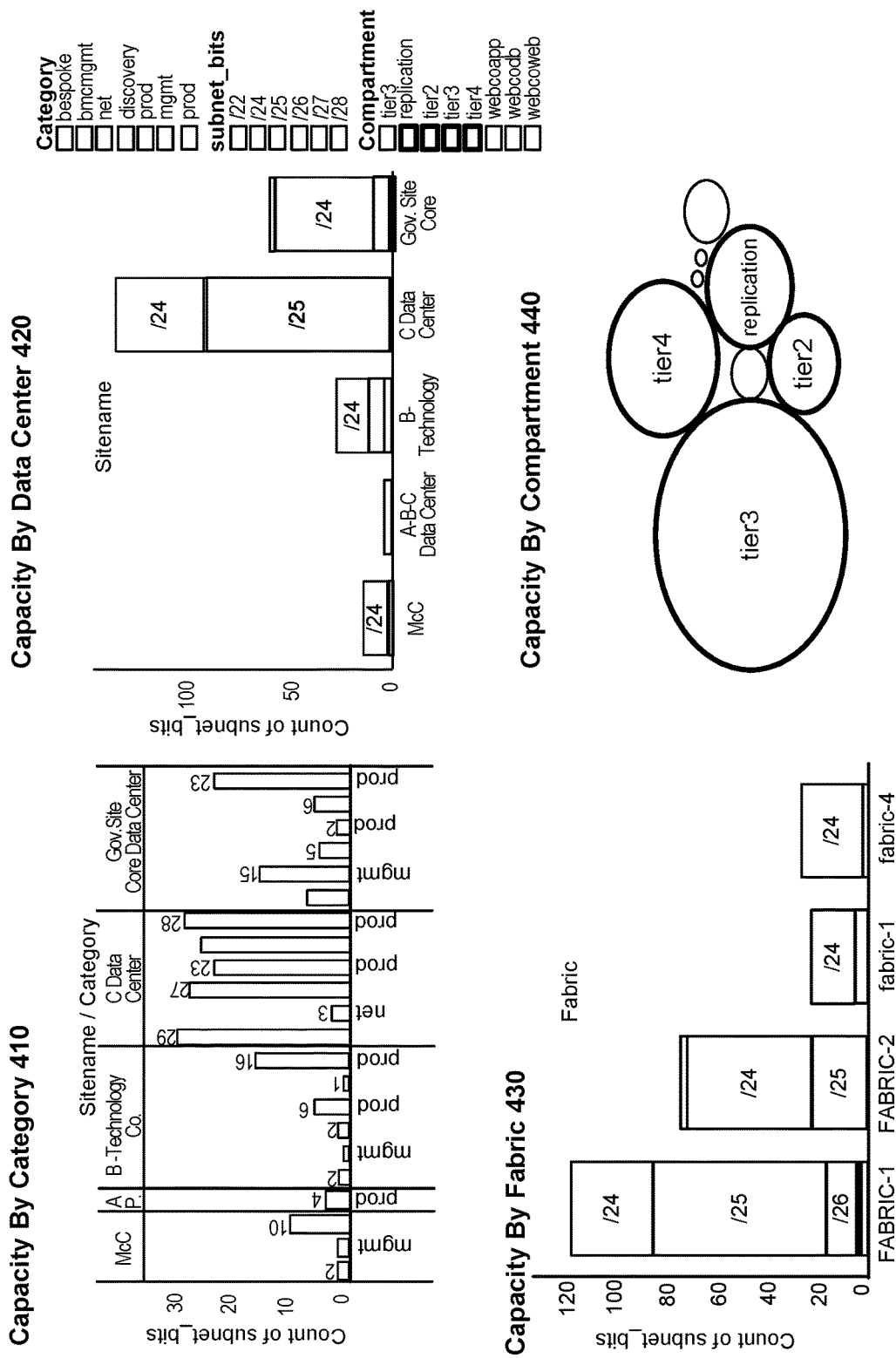
FIG. 4 is an exemplary interactive interface, according to an embodiment of the present invention.

FIG. 4 is an exemplary interactive interface, according to an embodiment of the present invention. An embodiment of the present invention may generate reports through web connectors. FIG. 4 illustrates network subnet capacity. As shown in FIG. 4, an embodiment of the present invention may illustrate capacity by category 410, capacity by data center 420, capacity by fabric 430 and capacity by component 440. Fabric may represent a data center fabric that includes physical network of servers, network devices, etc. This may provide network services such as network connectivity. For example, each data center may have one or more number of data center fabrics. Other metrics and segments may be illustrated. Other variations in graphics may be provided.

An embodiment of the present invention may provide data flow between various components through a message broker to publish events. Exemplary messages may relate to expand network capacity, configure network, remove network, etc.

For example, expand network capacity may represent a message sent to indicate that network capacity has to be added in a datacenter. Other network capacity management message may be sent. Configure network may represent a message sent to indicate network capacity has to be configured on the network devices. Remove network may represent a message sent to indicate network capacity has to be removed on network devices. Other network device configuration messages may be sent.

FIG. 5 is an exemplary interactive interface, according to an embodiment of the present invention. Network capacity analytics and management may be represented as a suite of micro-services designed to eliminate manual network capacity management. An embodiment of the present invention is directed to pre-reserving and pre-configuring network subnets on network devices in data centers to remove silo-ed manual network capacity management. An embodiment of the present invention seeks to reduce current SLAs of 30-40 days to less than a single day and further reserve and configure subnets as well as improve staffing plans. An embodiment of the present invention is directed to forecasting future demand of subnets for data centers, checking the pre-configurations and showing if there is a need for new subsets.

As shown at 510, a data center may be selected. While a single data center is shown, other variations may be applied (e.g., multiple data centers, regions, sub-section of a data center, etc.). At 520, subnet demand forecast on a daily basis may be shown. In this example, a forecast (e.g., number of subnets) may be identified for a particular date. Other metrics that represent forecast may be provided as well. At 530, subnet demand forecast on a weekly basis may be displayed. Other time periods may be provided. As shown by 530, a number of in use subnets, available subnets, capacity forecast and extra capacity needed are provided. In addition, various other comparison features may be applied.

Figure 6:
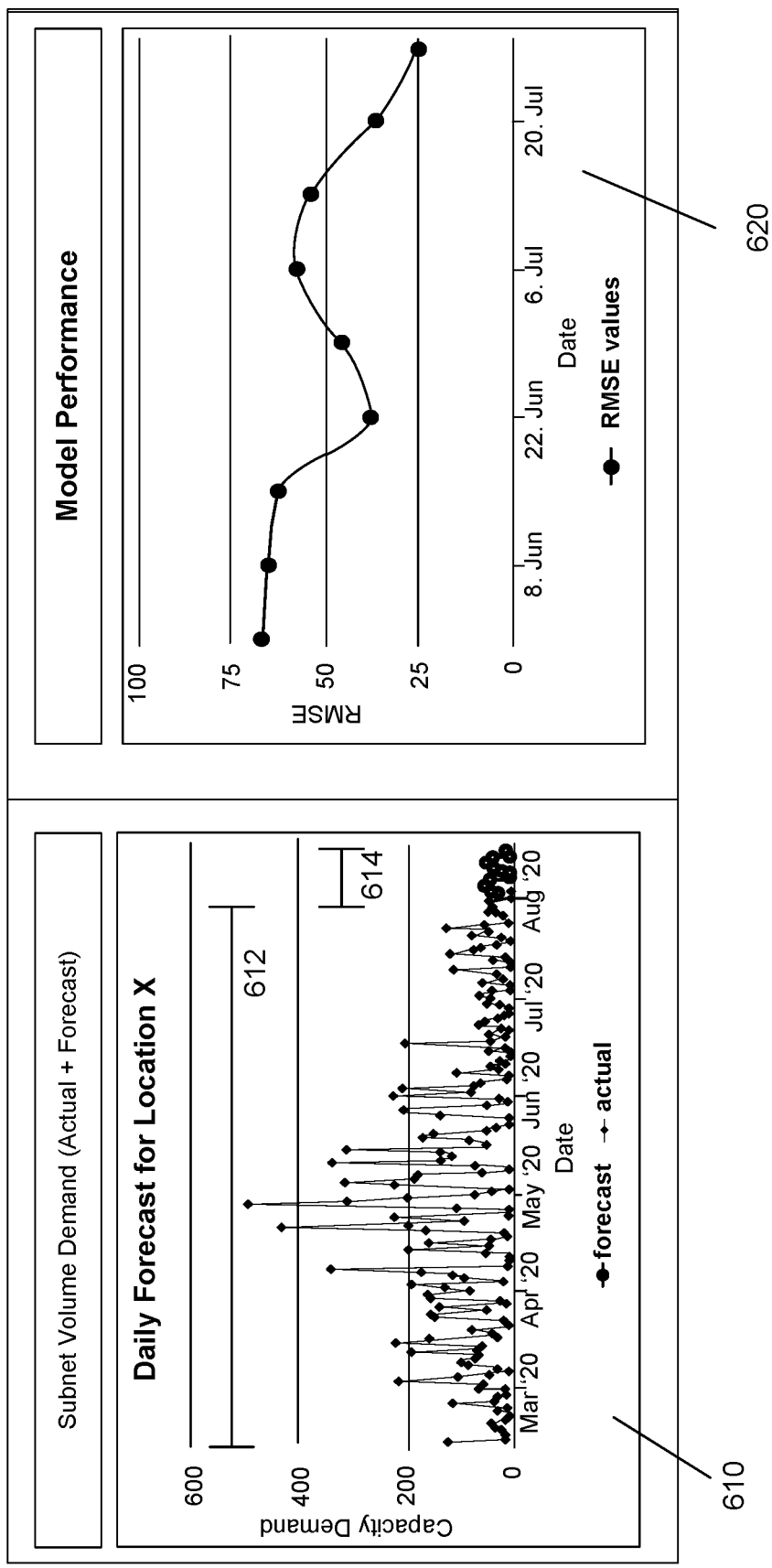
FIG. 6 is an illustration of forecast as compared to model performance, according to an embodiment of the present invention.

FIG. 6 is an illustration of forecast as compared to model performance, according to an embodiment of the present invention. Chart 610 illustrates subnet volume demand (actual and forecast). More specifically, Chart 610 provides daily forecast data for a specific location. The specific location may represent a data center, geographic area and/or other defined set of devices or area. Actual is provided by 612 and forecast is illustrated at 614.

Chart 620 illustrates model performance as depicted by root mean square error (RMSE) values. RMSE represents an error metric that may be used to check the accuracy of a forecast/prediction model. The formula of RMSE is $$\sqrt{\frac{\sum_{i=1}^{n}(\hat{y}i - yi)^2}{n}}$$

where $\hat{y}_i$ is the forecast value, $y_i$ is the actual value, n is the number of days predicted. In an exemplary implementation, a mean_squared_error function from sklearn.metrics library may be used to calculate the mean square error (MSE) on actual and forecasted values and then apply a SQRT function from math library on the MSE value to get a RMSE value.

Other embodiments, uses, and advantages of the invention will be apparent to those skilled in the art from consideration of the specification and practice of the invention disclosed herein. The specification and examples should be considered exemplary only, and the scope of the invention is accordingly not intended to be limited thereby.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that provides network IP address capacity analytics and management, the system comprising:
   a repository that stores and manages IP subnets;
   an interactive interface that displays subnet demand forecast data; and
   a capacity management processor coupled to the repository and the interactive interface and further programmed to perform:
      receiving historical IP subnet data comprising historical network allocations and a plurality of historical IP address range requests;
      running predictive analytics using time series analysis on the historical IP subnet data to predict future IP address range requests;
      responsive to the predictive analytics, identifying one or more free IP subnets that are predicted to be unutilized in a first data center during a specified time period;
      reserving the one or more free IP subnets by masking the one or more free IP subnets with corresponding one or more subnet bit masks for the specified time period and storing the one or more free IP subnets in the repository;
      responsive to the predictive analysis, identifying a number of additional IP subnets that are predicted to be added to a second data center during the specified time period;
      determining whether the number of additional IP subnets for the second data center are available in the repository during the specified time period;
      reserving the number of additional IP subnets for the second data center with a subnet reservation service;
      registering the number of additional IP subnets for the second data center in a server;
      adding, at the subnet reservation service, the number of additional IP subnets for the second data center in a DNS service;
      delivering the number of additional IP subnets for the second data center for configuration; and
      applying, at a network configuration service, at least one firewall rule to the number of additional IP subnets for the second data center.

2. The system of claim 1, wherein the capacity predication is based on time series analytics.

3. The system of claim 1, wherein the delivering of the number of IP subnets for configuration occurs prior to a user request for capacity.

4. The system of claim 1, wherein the historical data is generated from a system of record that receives one or more API requests.

5. The system of claim 1, wherein the number of IP subnets for the second data center are API based configurations.

6. The system of claim 1, wherein the interactive interface generates and displays subnet demand forecast data on a daily basis for a selected data center.

7. The system of claim 1, wherein the interactive interface generates and displays subnet demand forecast data on a weekly basis for a selected data center.

8. The system of claim 1, wherein the interactive interface generates and displays daily forecast data and corresponding actual data.

9. The system of claim 8, wherein the interactive interface generates and displays corresponding model performance data.

10. The system of claim 9, wherein the corresponding model performance data comprises corresponding root mean square error (RMSE) values.

11. A method that provides network IP address capacity analytics and management, the method comprising:
receiving, via a computer processor, historical IP subnet data comprising historical network allocations and a plurality of historical IP address range requests;
running, via a computer processor, predictive analytics using time series analysis on the historical IP subnet data to predict future IP address range requests;
responsive to the analysis, identifying one or more free IP subnets that are predicted to be unutilized in a first data center during a specified time period;
reserving the one or more free IP subnets by masking the one or more free IP subnets with corresponding one or more subnet bit masks for the specified time period and storing the one or more free IP subnets in a repository, wherein the repository stores and manages IP subnets;
responsive to the predictive analysis, identifying a number of additional IP subnets that are predicted to be added to a second data center during the specified time period;
determining whether the number of additional IP subnets for the second data center are available in the repository during the specified time period;
reserving the number of additional IP subnets for the second data center with a subnet reservation service;
registering the number of additional IP subnets for the second data center in a server;
adding, at the subnet reservation service, the number of additional IP subnets for the second data center in a DNS service;
delivering the number of additional IP subnets for the second data center for configuration;
applying, at a network configuration service, at least one firewall rule to the number of additional IP subnets for the second data center; and
displaying, via an interactive interface, subnet demand forecast data.

12. The method of claim 11, wherein the capacity predication is based on time series analytics.

13. The method of claim 11, wherein the delivering of the number of IP subnets to be added for configuration occurs prior to a user request for capacity.

14. The method of claim 11, wherein the historical data is generated from a system of record that receives one or more API requests.

15. The method of claim 11, wherein the number of IP subnets to be added are API based configurations.

16. The method of claim 11, wherein the interactive interface generates and displays subnet demand forecast data on a daily basis for a selected data center.

17. The method of claim 11, wherein the interactive interface generates and displays subnet demand forecast data on a weekly basis for a selected data center.

18. The method of claim 11, wherein the interactive interface generates and displays daily forecast data and corresponding actual data.

19. The method of claim 18, wherein the interactive interface generates and displays corresponding model performance data.

20. The method of claim 19, wherein the corresponding model performance data comprises corresponding root mean square error (RMSE) values.

* * * * *